UNITED STATES PATENT OFFICE.

C. A. MORSE, OF WILLIAMSPORT, OHIO.

IMPROVED MEDICAL COMPOUND.

Specification forming part of Letters Patent No. 44,106, dated September 6, 1864.

*To all whom it may concern:*

Be it known that I, C. A. MORSE, of Williamsport, in the county of Pickaway and State of Ohio, have invented a new and Improved Medical Compound; and I do hereby declare that the following is a full, clear, and exact description of the same.

This compound, which is termed "Caucasian lotion," is particularly intended for removing tan, freckles, mildew, &c., from the face and other parts of the body. It is composed of a solution of chloride of mercury, borax, tartaric acid, oxalic acid, and sal-ammoniac in alcohol and water, which solution is mixed with tincture of gum-benzoin, extract of roses, extract of lemon, and chloride of lime. The proportion in which I mix these ingredients together is about as follows: rain-water, two quarts; alcohol, one quart; chloride of mercury, one-half ounce; sal-ammoniac, one-half ounce; tartaric acid, one-half ounce; oxalic acid, one-half ounce; borax, one-half ounce; tincture of gum-benzoin, one ounce; extract of roses, one ounce; extract of lemon, one ounce; chloride of lime, one dram. The chloride of mercury, sal-ammoniac, tartaric acid, oxalic acid, and borax are dissolved in the water, the chloride of lime is added, and the tincture of gum-benzoin, extract of roses, and extract of lemon are diluted with the alcohol and added to the previous solution, when the mixture is ready for use. The extract of roses and extract of lemon are simply used for the purpose of flavoring the lotion, and it is obvious that any other extract can be used for the same purpose.

I do not wish to confine myself to any peculiar substance or substances for flavoring the lotion, but reserve the right to change this part of the composition to suit taste and convenience.

I claim as new and desire to secure by Letters Patent—

The Caucasian lotion prepared of the within-described ingredients, mixed together in about the proportion and substantially in the manner specified.

C. A. MORSE.

Witnesses:
J. J. ALKIRE,
N. R. ALKIRE.